Aug. 16, 1966     R. G. SCHUETZLER     3,266,420
RETRACTION MECHANISM FOR NOSE CONE SECURABLE
TO AERIAL LAUNCHED BODIES

Filed July 27, 1964     2 Sheets-Sheet 1

INVENTOR
*Rudolph G. Schuetzler*

BY

ATTORNEY

Aug. 16, 1966  R. G. SCHUETZLER  3,266,420
RETRACTION MECHANISM FOR NOSE CONE SECURABLE
TO AERIAL LAUNCHED BODIES
Filed July 27, 1964  2 Sheets-Sheet 2
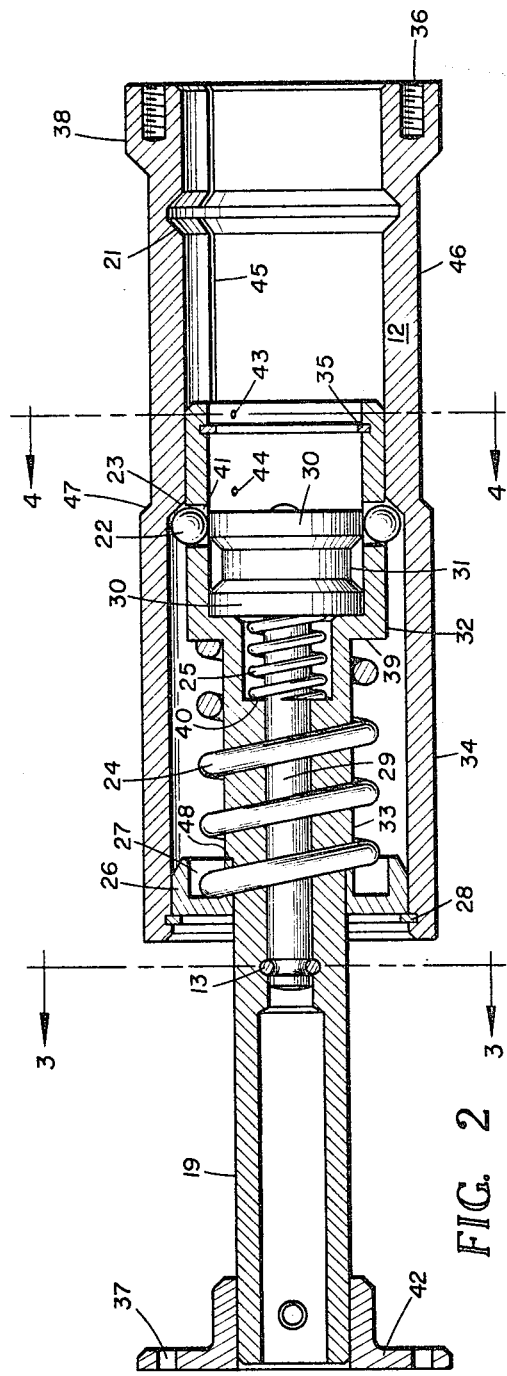
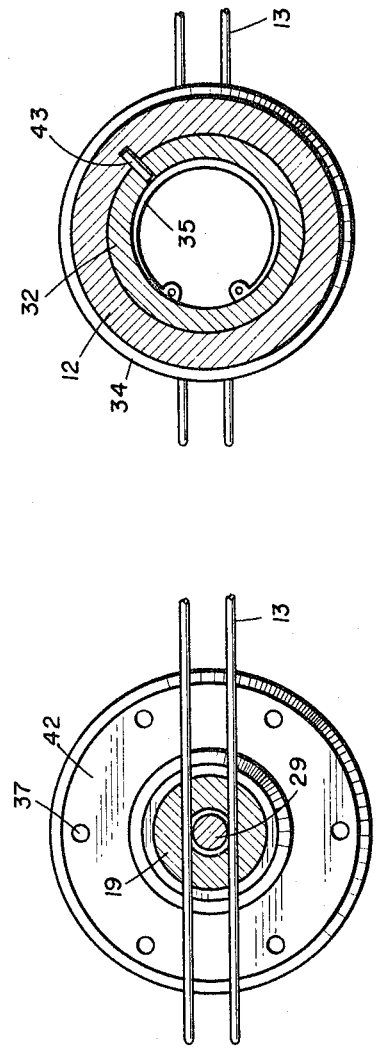
INVENTOR
Rudolph G. Schuetzler
BY
ATTORNEY

United States Patent Office 3,266,420
Patented August 16, 1966

3,266,420
RETRACTION MECHANISM FOR NOSE CONE SECURABLE TO AERIAL LAUNCHED BODIES
Rudolph G. Schuetzler, Adelphi, Md., assignor to the United States of America as represented by the Secretary of the Navy
Filed July 27, 1964, Ser. No. 385,524
4 Claims. (Cl. 102—4)

The invention described herein may be manufactured and used by or for the Government of the United States of America for governmental purposes without the payment of any royalties thereon or therefor.

The present invention relates generally to aerodynamic deceleration devices and more specifically to a novel retraction mechanism securable to the nose section of such a device for providing retraction thereof to increase the aerodynamic drag on and free-fall stability of said device.

In the past various devices have been employed to increase the aerodynamic drag on and free-fall stability of missiles, aircraft carried-aerial launched mines and the like. These devices include the flipout fins which are extended from the areodynamic device when a high stabilizing moment about the center of gravity of the device is desired. Flipout fins have not always proved satisfactory in operation, however, due to the complexity of the flipout fin design.

Other deceleration and stabilizing devices which operate to retract a nose from a shroud, or to otherwise move the shroud and nose relative to each other in order to increase the aerodynamic drag on and stability of the devices, include those which operate on air pressure. However, in these devices there must be a means for locking the shroud or nose in a desired position as well as a known source of air pressure to move the nose and shroud relative to each other.

The variable drag assembly of the present invention has been designed to overcome the aforedescribed disadvantages in the prior art aerodynamic deceleration and stabilizing devices.

The variable drag assembly of the present invention includes a retracting mechanism securable at one end to the shroud portion of a body carried by an aircraft and securable at the other end to a nose cone retractable within said shroud portion for increasing the wind drag on and free-fall stability of the body. The retracting mechanism comprises an outer sleeve member having first and second sections integrally joined by a shoulder section oblique to the longitudinal axis of the outer sleeve member. Within the outer sleeve member there is an inner sleeve member coaxial with and slidably engaging the outer sleeve member. A piston coaxial with and in slideable engagement with the inner sleeve member is positioned within the confines of the inner sleeve member and has a spool-like section at one end thereof. The ball-lock assembly of the retracting mechanism includes four balls resting on the oblique shoulder section of the outer sleeve member when the mechanism is in its unretracted position. In this position the balls extend through apertures in said inner sleeve member and into frictional engagement with section 30 of the spool-shaped section of the piston. By pulling a release wire which insures that the other end of the piston is in fixed engagement with the inner sleeve member before retraction takes place, a first compressed spring is allowed to actuate the piston whereby the annular groove in the spool-shaped section of the piston is forced into alignment with the apertures in the inner sleeve member for allowing the balls to disengage the shoulder of the outer sleeve member and pass radially inward through said aperture. Upon such disengagement of the balls with the shoulder, a second compressed spring drives the inner sleeve member with respect to the outer sleeve member thereby enabling the inner sleeve to retract within the outer sleeve. A further annular groove is provided in the outer sleeve member to engage the balls when the inner sleeve member is in its retracted position and to prevent the return of the inner sleeve to its unretracted position.

A object of the present invention is to provide a novel compact retraction mechanism securable to a nose cone of an aerial launched body and which is designed for operation once said body is released from an aircraft.

Another object is to provide a nose cone retraction mechanism which is easy to manufacture and which lends itself to compact storage and ease of installation.

Other and further objects will become more fully apparent in the following description of the illustrative embodiments thereof shown in the accompanying drawings wherein:

FIGURE 2 is a view of the retraction mechanism of FIG. 1, partly in section;

FIGURE 3 is a cross sectional view taken along lines 3—3 of FIG. 2; and

FIGURE 4 is a cross sectional view taken along lines 4—4 of FIG. 2.

Figure 1:
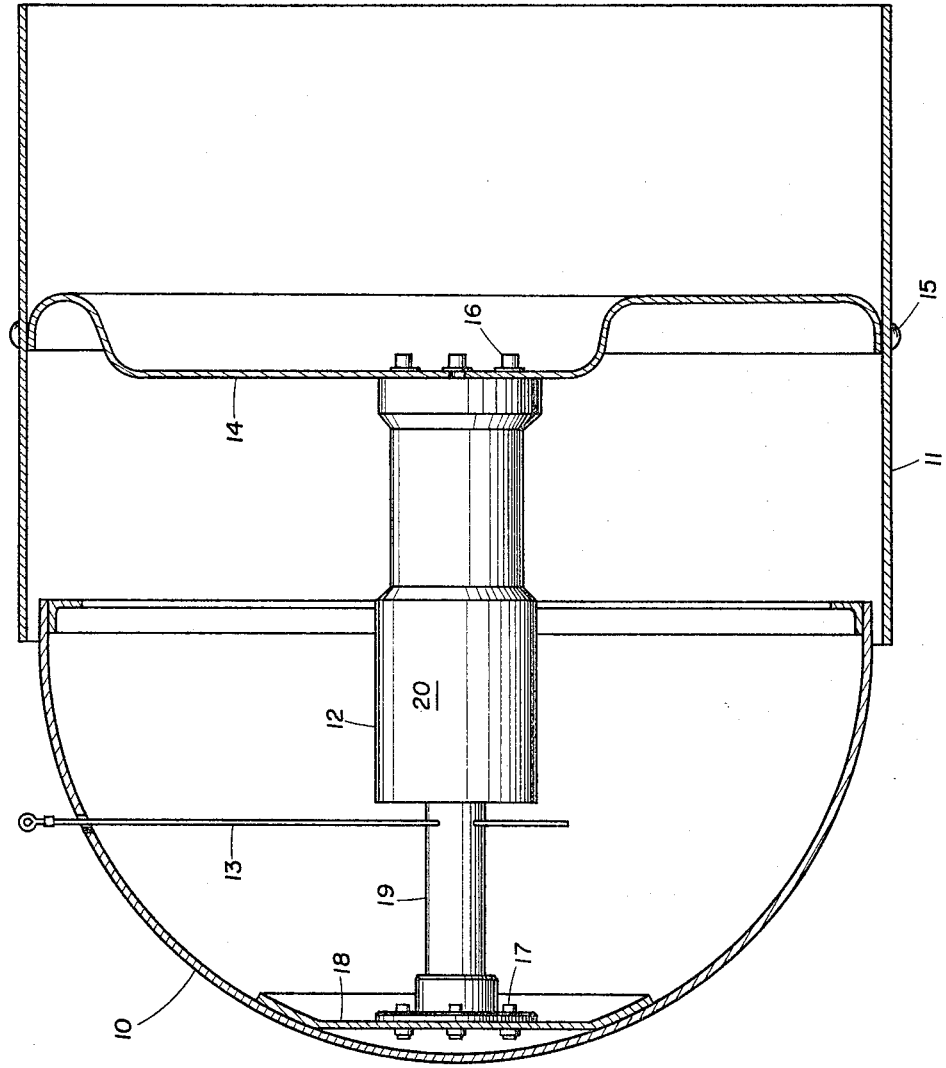
FIGURE 1 is a view of the retraction mechanism in its unretracted position secured to the shroud and nose cone of an aerial launched device.

Referring to FIG. 1 there is shown a cylindrical shroud 11 adapted to be attached to a mine or other aerial launched body and a hemispherical nose section 10 in its extended position relative to shroud 11. The retracting mechanism 20 in its extended position is bolted at 16 to a shroud support plate 14 which is riveted at 15 or otherwise secured to shroud 11 as shown in FIG. 1. The retracting mechanism 20 is secured to the nose section 10 by bolts 17 attached to the nose plate 18. When the drag assembly of the present invention is being carried by an aircraft, the nose remains in its extended position as shown in FIG. 1 to provide a low aerodynamic drag on the assembly. However, when the variable drag assembly is released from an aircraft it is desirable to increase the drag on and free-fall stability of the body or mine carried by shroud 11 especially during the period between aerial launch and complete parachute opening where a parachute is used to further retard the free-fall of the variable drag assembly. The increased stability and drag provided by the retraction of nose 10 within shroud 11 may be necessary to insure that the parachute is not destroyed, resulting in an inoperative mine or or other aerial launched body.

The novel retracting mechanism 20 as shown in FIG. 1 is shown in greater detail in FIG. 2. The retracting mechanism is comprised of an outer sleeve member 12 having a first section 46 and a second section 34 integrally joined by a shoulder section 47 which is oblique to the longitudinal axis of sleeve 12. Sleeve 12 further includes threaded bores 36 used in securing the sleeve 12 to the shroud support plate 14 as shown in FIG. 1.

A second inner sleeve member is positioned in slideable engagement within outer sleeve member 12 and is comprised of a first section 32 integrally joined at shoulder 39 with a second section 33. The inner sleeve member 33 is again reduced in diameter at shoulder 48 to engage the inner cylindrical portion of member 26.

Piston means are positioned within the inner sleeve member and are comprised of a first spool shaped section in slideable engagement with the first section 32 of the inner sleeve member. This spool shaped section is integrally joined to a longitudinal bar member 29 which is coaxial with inner sleeve member 33 and is secured to member 33 by a release wire 13 which occupies a portion of a cylindrical groove in the longitudinal bar 29 and a hole in the inner sleeve member 19. The spool shaped section of the piston has a portion 31 of reduced diameter and a pair of end sections 30, one of which engages ball 22 while the retraction mechanism 20 is in its unretracted position. Once, however, the spool shaped section of the inner piston is moved so that the section 31 thereof becomes aligned with aperture 41 in the first section 32 of the inner sleeve member, the ball becomes free to move radially inward from its rest position on the oblique section 47 of the outer sleeve member. Such radial movement of ball 22 enables the inner sleeve member to move in slideable engagement with the outer sleeve member 12.

There is an inner compressed spring 25 surrounding longitudinal bar 29 and exerting a force on the outer face of section 30 of the piston. The inner spring member 25 is engaged at its other end by an inner shoulder portion 40 of the inner sleeve member 33. Therefore, when the release wire 13 is removed to release all restraint on spring member 25, this spring becomes decompressed, forcing the spool shaped section of the inner piston past the aperture 41 in the inner sleeve member to allow ball 22 to move radially inward and engage piston section 31 of reduced diameter. When the ball 22 disengages the oblique section 47 of the outer sleeve member, the outer spring member 24, resting at one end on the outer shoulder portion 39 of the inner sleeve member and at the other end in the annular cavity 27 of support member 26 becomes decompressed to cause a retraction of the inner sleeve member within the outer sleeve member.

The outer sleeve member has a retaining ring 28 mounted at one end thereof to support the member 26 engaging the outer spring 24. The inner sleeve member 32 has a similar retaining ring 35 mounted at one end thereof to prevent the spool shaped section of the piston from sliding out of engagement with section 32. The inner sleeve member 32 likewise has a pair of spaced pin members 43 and 44 extending therefrom into the longitudinal groove 45. The purpose of this design is to prevent any relative rotation between the inner sleeve member 32 and the outer sleeve member 12.

The outer sleeve member has an annular groove 21 in one end thereof through which the longitudinal groove extends. However, there is a discontinuity in the longitudinal groove 45 in the annular groove 21 due to the relative depths of the two grooves. However, with the pins 43 and 44 spaced apart as shown in FIG. 2, only one of these pins can enter the discontinued portion of groove 45 at one time, and this insures that relative rotation between the inner sleeve and outer sleeve is prevented at all times during the retracting action.

After the ball 22 has passed into the spool section 31 of reduced diameter, the spool and inner sleeve member 32 become locked against any relative movement therebetween once the inner sleeve member 32 begins to retract within the outer sleeve member. It should be noted that the spring constants of springs 24 and 25 have been properly selected in order to insure that ball 22 will not be forced radially outward through aperture 41 against the decompression force exerted by spring 24 prior to the retraction of the inner sleeve member.

Once the ball 22, engaging section 31 and extending within aperture 41, becomes aligned with the annular groove 21 in the outer sleeve member, it is forced radially outward by virtue of spring 25 acting upon one oblique section of the spool intermediate sections 30 and 31 to exert a radial force upon ball 22. When the ball 22 enters annular groove 21, spring 25 forces the spool-shaped section of the piston into contact with retaining ring 35. In this position, a section 30 of the piston is once again aligned with aperture 41 to prevent further radial movement of ball 22 and to insure the inner sleeve remains locked in its retracted position.

It should be noted that this invention is not limited to the specific type of springs shown in the drawings nor is it limited to the particular shapes of the sleeve members. Furthermore, many modifications of this invention are possible without departing from the spirit and scope thereof.

I claim:
1. A retracting mechanism comprising:
an outer sleeve member having a first section and a second section integrally joined by a shoulder section which is oblique to the longitudinal axis of said outer sleeve, said first section having a larger diameter bore than said second section, said second section having an annular groove in the inner surface thereof,
an inner sleeve member having an aperture therein and in slideable engagement with the inner surface of said second section of said outer sleeve member,
a ball positioned within the aperture in said inner sleeve member,
a spool-shaped piston coaxial with and in slideable engagement with the inner surface of said inner sleeve member, said piston having a first, larger diameter section the outer periphery of which engages and urges said ball radially outward into frictional engagement with said oblique shoulder section of said outer sleeve member thereby locking said inner sleeve member against relative movement within said outer sleeve member when said piston is in a first position relative to said inner sleeve member, a second, smaller diameter section which permits said ball to move radially inward thereby disengaging said oblique shoulder section of said outer sleeve member and permitting relative movement between said inner sleeve member and said outer sleeve member when said piston is in a second position relative to said inner sleeve member, and a third, larger diameter section the outer periphery of which engages and urges said ball radially outward into said annular groove in said second section of said outer sleeve member thereby locking said inner sleeve member against relative movement within said outer sleeve member when said piston is in a third position relative to said inner sleeve member,
a first spring acting against said piston and said inner sleeve member and urging said piston from said first position relative to said inner sleeve member toward said second position and thence toward said third position.
a second spring acting against said inner sleeve member and said outer sleeve member and urging said inner sleeve member into said outer sleeve member, and
arming means releasably securing said piston in said first position to maintain said first and second springs compressed before retraction of said inner sleeve member into said outer sleeve member whereby upon release of said arming means said piston is driven by said first spring to said second position allowing said ball to disengage said oblique shoulder section thus permitting said second spring to drive said inner sleeve member into said outer sleeve member until said aperture in said inner sleeve member comes into registry with said annular groove in said outer sleeve member at which time said ball is urged into said groove by said piston as it is driven to said third position by said first spring.
2. The combination of claim 1 wherein
said piston includes a slender longitudinal member integrally formed with said spool shaped member and having said arming means attached at one end thereof.
3. The combination of claim 2 wherein
said outer sleeve means has a longitudinal groove in the inner surface of the second section thereof, a first pin member extending from said inner sleeve means into said groove and a second pin member spaced longitudinally from said first pin and extending from said inner sleeve means into said groove to prevent relative rotation between inner sleeve means and said outer sleeve means.

4. The combination of claim 2 wherein said arming means consists of a wire occupying a portion of a cylindrical groove in said longitudinal member and holes in said inner sleeve member.

References Cited by the Examiner

UNITED STATES PATENTS

| | | | |
|---|---|---|---|
| 1,274,281 | 7/1918 | Kowalski | 102—92.5 |
| 2,729,495 | 1/1956 | Dejean | 89—1.5 X |
| 2,936,710 | 5/1960 | Bollay | 102—50 |
| 3,065,011 | 11/1962 | Pew | 89—1.5 X |
| 3,107,619 | 10/1963 | Daniels | 102—92.5 |
| 3,160,373 | 12/1964 | Taddonio | 102—4 X |

BENJAMIN A. BORCHELT, *Primary Examiner.*

SAMUEL W. ENGLE, *Examiner.*